United States Patent [19]

Germer

[11] 3,707,920
[45] Jan. 2, 1973

[54] LATERAL RAILWAY SPRING SUSPENSION SYSTEM

[75] Inventor: John A. Germer, Doylestown, Pa.

[73] Assignee: The Budd Company, Philadelphia, Pa.

[22] Filed: Oct. 28, 1970

[21] Appl. No.: 84,682

[52] U.S. Cl.................105/210, 104/139, 105/1 A, 105/171, 105/199 R, 105/453, 267/3
[51] Int. Cl.............B61f 3/00, B61f 5/02, B61f 5/30
[58] Field of Search......105/2 R, 171, 174, 210, 211, 105/212, 213, 1 A, 199 R, 453; 267/3; 104/139

[56] References Cited

UNITED STATES PATENTS

| | | | |
|---|---|---|---|
| 3,115,100 | 12/1963 | Janeway | 105/174 |
| 1,954,705 | 4/1934 | Kruckenberg et al. | 105/174 X |
| 2,899,911 | 8/1959 | Lich | 105/171 |
| 1,676,259 | 7/1928 | Getchell | 105/174 |
| 2,080,180 | 5/1937 | Messier | 105/171 |

Primary Examiner—Gerald M. Forlenza
Assistant Examiner—Howard Beltran
Attorney—Thomas I. Davenport, Edward M. Farrell, John D. Sowell, Alford Trueax, Jr. and William R. Nolte

[57] ABSTRACT

A lateral spring suspension system for attenuating lateral truck movements relative to a carbody and a track for acceptable ride comfort. A pair of tow bars pivotally connected to the truck frame with spring loaded guide means therebetween serve to cushion lateral movements of the truck relative to the carbody and the track. Torques generated by accelerating and braking are transmitted into the carbody through the upper and lower tow bars.

4 Claims, 6 Drawing Figures

PATENTED JAN 2 1973 3,707,920

INVENTOR.
JOHN A. GERMER
BY
William R. Nolte
AGENT

INVENTOR.
JOHN A. GERMER
BY
William R. Nolte
AGENT

INVENTOR.
JOHN A. GERMER
BY
William R. Nolte
AGENT

LATERAL RAILWAY SPRING SUSPENSION SYSTEM

This invention relates to lateral spring suspension systems and more particularly to lateral spring suspension systems for use between a carbody and a wheeled-truck movable along a track.

Heretofore in railroad practice, railcars used in intercity traffic have used trucks with bolsters having springs on top of the bolsters to support the carbodies. Such springs in many instances have served to attenuate lateral movements of the truck relative to the track and the carbody. However such cars with bolsters and springs have proved disadvantageous in the short run transportation of passengers from center city locations to city airports for example. Due to the oftentimes circuitous routing of the tracks with sharp curves, cars with bolsters having the above suspension systems have proved unable to negotiate the sharp curves involved. Upon the application os acceleration or braking forces by the propulsion and brake systems, some such forces have been transmitted through the vertical springs and into the carbody. In addition rotational movements of the truck about its vertical axis have produced disturbances in the lateral spring systems of the railcar. Another difficulty of such standard type cars has been that they have not been suitable for use on elevated guideways. Due to their great height such cars would not provide maximum safety.

Accordingly it is the principal object of this invention to provide a lateral spring suspension system for a railcar which avoids one or more of the disadvantages of the prior art lateral spring arrangements.

It is another principal object of this invention to provide a lateral spring suspension system for a carbody having a truck with a wheel-axle unit wherein acceleration and braking forces applied to the wheel-axle unit are not transmitted into the lateral spring suspension system.

In accordance with the invention, the lateral spring suspension system employed between a carbody and a truck having a wheel-axle unit and journalled for rotation on a frame and subjected to acceleration and braking forces comprises, first and second tow bars. The tow bars are disposed in parallel relationship and mounted for rotation about horizontal pivotal axes at one of their ends. The frame means includes spaced apart upper and lower portions to which are attached the other ends of the tow bars by pivot means. Lateral spring means are associated with the pivot means to resist lateral excursions of said truck relative to the carbody.

For a better understanding of the present invention, together with other and further objects thereof reference is had to the following description taken in connection with the accompanying drawing.

Figure 1:
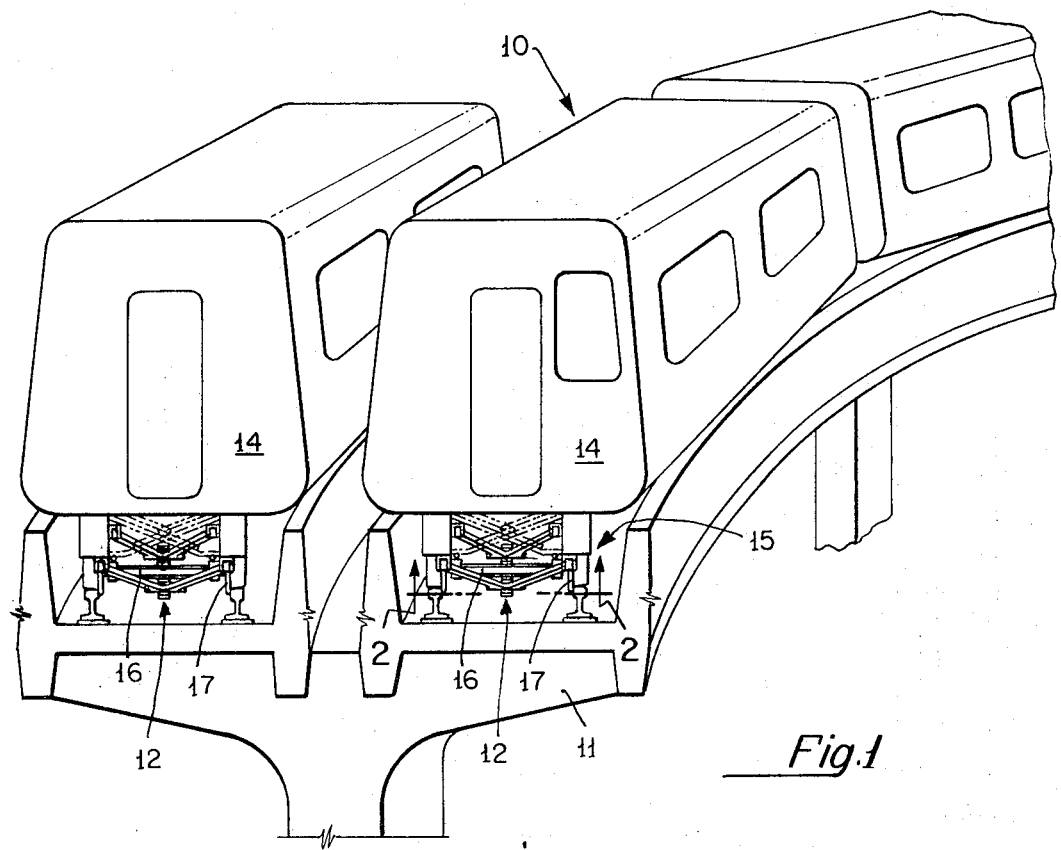
FIG. 1 is a vertical elevational view partially schematic showing a railcar on a track employing the lateral suspension system of the present invention.

Referring to FIG. 1 of the drawing, there is shown a railcar 10, partially schematic supported on an elevated track guideway 11. The car includes a lateral spring suspension system 12 embodying the present invention, which is interposed between the body 14 of the car and its truck 15 having an axle 16, and wheels 17. The truck includes a transverse frame 19 having journal bearing end portions 20 which support vertical suspension springs 21 and the carbody 14 thereabove. The suspension springs 21 are indicated schematically, and shown and described in copending application Ser. No. 84,692 titled "Vertical Railway Spring Suspension System," inventor John A. Germer, filed Oct. 28, 1970, and assigned to the same assignee as the instant invention.

Figure 3:
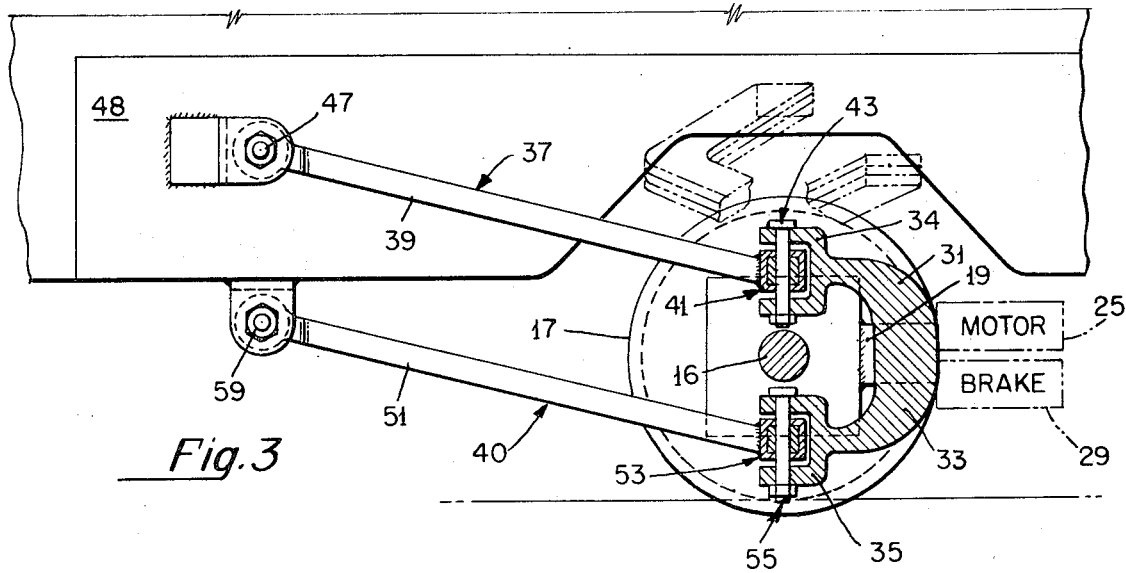
FIG. 3 is a side elevational sectional view taken along the lines 3—3 of FIG. 2.
Figure 2:
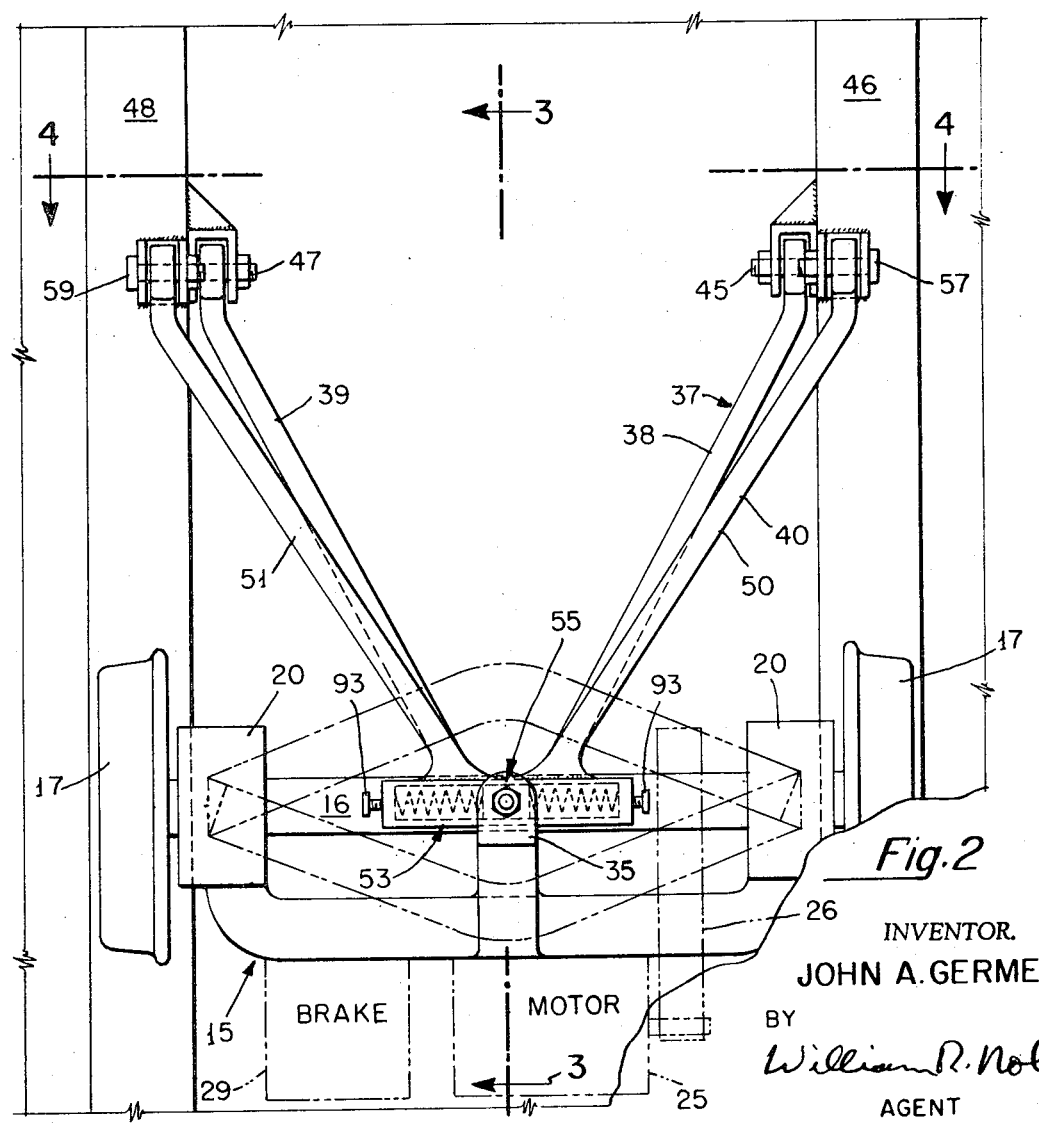
FIG. 2 is an end elevational view greatly enlarged showing the truck supporting the carbody.

With further reference to FIGS. 2 and 3, the aforementioned transverse frame member 19 is offset rearwardly of axle 16 to support a motor 25. A suitable drive connection 26 transmits acceleration forces to the axle 16. A brake unit 29 shown incorporated with the motor, when suitably activated generates braking torque loads to the axle through drive connection 26. The central portion of the transverse frame includes an upper curved projecting portion 31 and a lower curved projecting portion 33, each having an upper clevis portion 34 and a lower clevis portion 35 respectively. A pair of bifurcated upper and lower tow bars 37, 40 respectively are received in the clevis portions. The upper tow bar 37 includes arm portions 38, 39 which converge at one end to terminate in a transverse elongated box portion 41 which receives slidable vertical pivot block means 43. The pivot block means 43 is secured to upper clevis means 34. The other end of arm 38 opposite block portion 41 is connected by horizontally disposed pivot means 45 to side underframe member 46 of the car, while the other end of arm 39 is similarly pivoted by means of pivot means 47 to the opposite side frame member 48.

In a similar manner lower tow bar 40 includes arm members 50, 51 which likewise converge at their one ends to terminate in a transverse elongated box portion 53 which receives lower slidable pivot means 55. The lower pivot means 55 is secured to lower clevis means 35. The other end of tow bar arm 50 is connected to horizontally disposed pivot means 57 connected to the underside of frame member 46 while the other end of corresponding arm 51 is similarly connected by lower horizontally disposed pivot means 59 to the under surface of said frame member 48.

Figure 4:
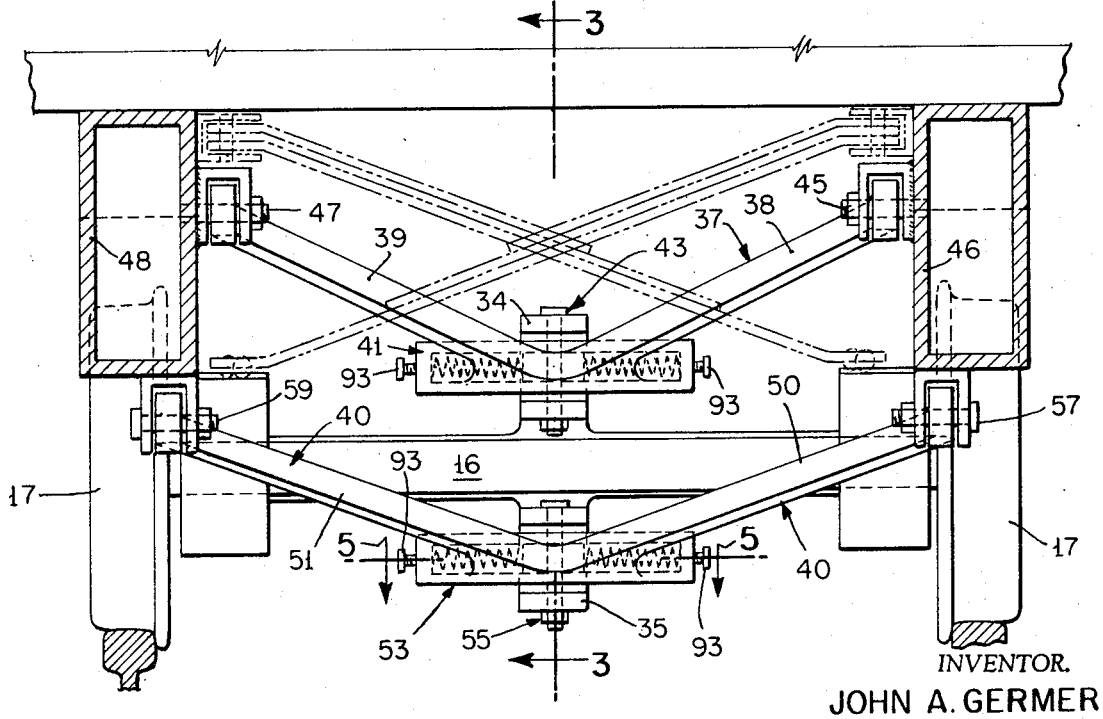
FIG. 4 is a view taken along the line 4—4 of FIG. 2 showing the underneath side of the truck employing the lateral suspension system of the present invention.

It is observed in FIG. 4 the axes of pivot means 45, 47 are horizontally aligned, as well as axes of pivot means 57, 59. It should further be noted that the tow bar means 37, 40 are parallel and of the same length. The vertical distance between pivot means 45, 47 and 57, 59 are the same as the mouths of its clevis portions 34, 35. The tow bar means are thus disposed in a parallelogram linkage such that any relative vertical movement between the carbody 14 and truck 15 introduces rotation of the tow bars 37, 40 about their respective pivots.

Figure 5:
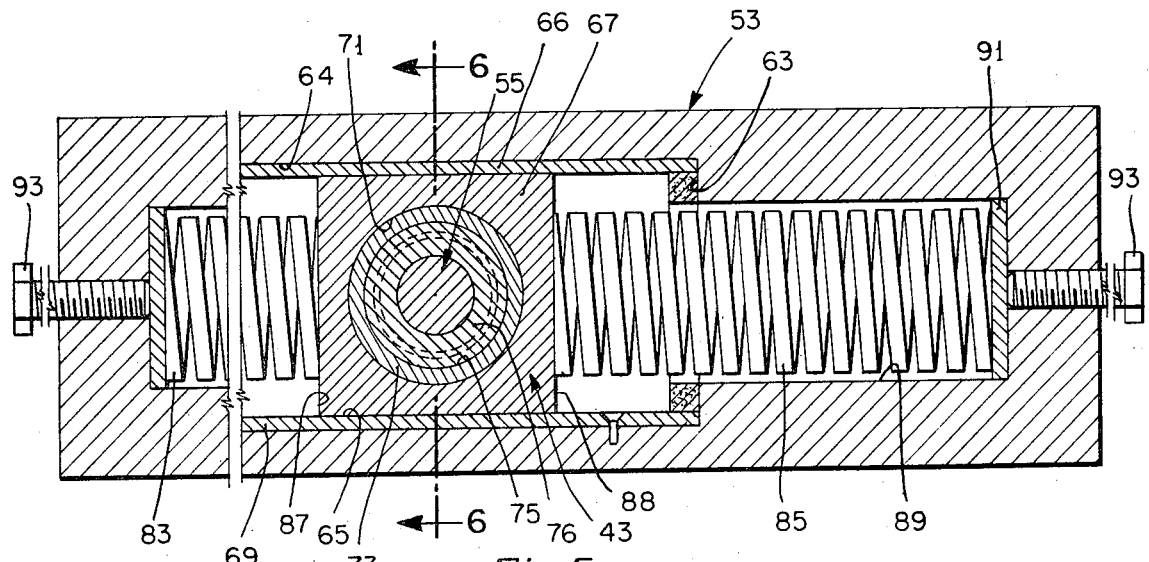
Figure 6:
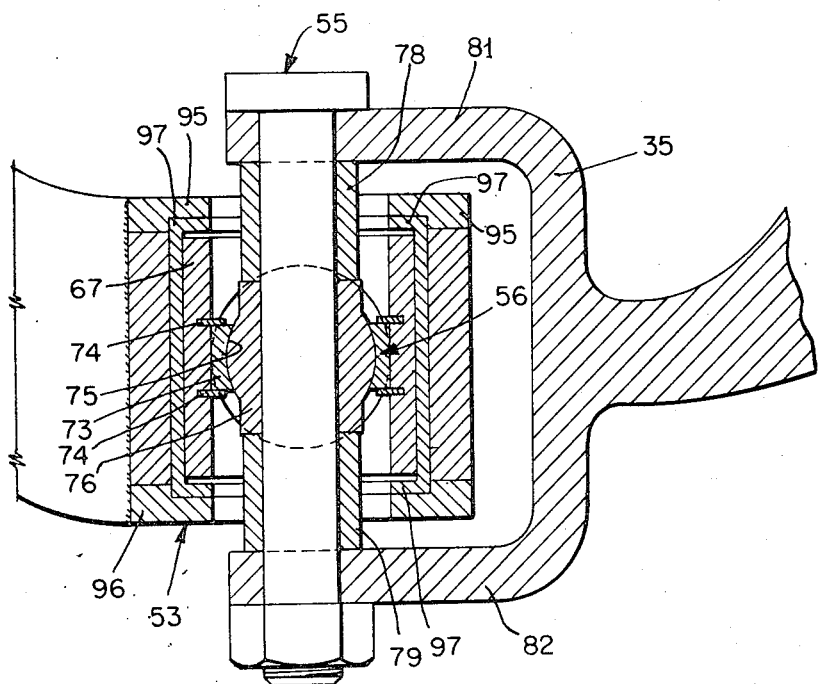

In order to prevent rotation of the truck frame 15 about the axis of axle 16 upon rotation of the tow bars 37, 40 about their respective horizontal axes, the pivot means 55 are shown in FIGS 5, 6 as including spherical bearing means 56. See FIGS. 5 and 6. The box portion 41 integral with tow bar 37 is identical in construction to the hereinafter described box portion 53. The box portion is centrally slotted as at 63. The fore and aft vertical wall surfaces 64, 65 have secured thereto bearing plates 66 of material such as bronze to provide sliding contact for rectangular pivot block 67. The fore and aft end walls 68, 69 engage the bearing plates in sliding contact as the block is moved laterally in the slot 63. The central portion of the block includes a vertical cylindrical opening 71 into which is housed a horizontally disposed plate portion 73 by means of snap ring spacer washers 74. The plate includes a central spherical surface 75 into which is received a spherical ball member 76 which in turn is vertically positioned on vertical pivot pin 77 by upper and lower space sleeve members 78, 79 respectively. The pivot pin 77 is shown extending through the upper and lower tongue portions 81, 82 of lower clevis 35.

Still referring to FIGS. 5 and 6 it is observed that opposed lateral springs 83, 85 at their inner ends engage end faces 87, 88 of the aforementioned pivot block 67. The springs 83, 85 are received in slots 89 of reduced width and axially aligned relative to central slot 63 containing the pivot block. The outer ends of the springs 83, 85 coact with and abut an end plate 91 which can be moved along the length of the slot 89 by means of adjusting screw 93, to thereby vary the loading of the lateral springs 83, 85.

As best seen in FIG. 6 the aforementioned pivot block as well as springs 83,85 are retained vertically in slots 63, 89 by means of suitable top and bottom retainer plates 95, 96 respectively which are suitably recessed along their inner surfaces to receive bearing strips 97 to facilitate sliding contact with bearing block 67.

While there has been described what at present in considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A suspension system for transmitting lateral loads from a truck to a carbody, said truck including a wheel-axle unit and frame means journalling said wheel-axle unit for rotation, the combination comprising, tow bar means, including upper and lower tow bars straddling said wheel-axle means, each said upper and lower tow bars including one end portion secured to said truck frame means and an other portion bifurcated to constitute two arms having extremities secured to opposite sides of the carbody, vertically disposed pivot means interconnecting said upper and lower tow bars to said frame means, means for guiding said pivot means laterally of said carbody means, and spring means coacting with said pivot means and said guide means for resisting lateral movements of said truck relative to said carbody.

2. In the suspension system for transmitting lateral loads from a truck to a carbody as set forth in claim 1 wherein said upper and lower tow bars are disposed in parallel relation, and including pivot means mounting said upper and lower tow bars to said carbody for vertical swinging movement.

3. In the suspension system for transmitting lateral loads from a truck to a carbody as set forth in claim 1 wherein said disposed pivot means interconnecting said upper and lower tow bars are axially aligned.

4. In the suspension system for transmitting lateral loads from a truck to a carbody as set forth in claim 3 wherein said vertically disposed pivot means each include spherical bearing means.

* * * * *